United States Statutory Invention Registration [19]

[11] Reg. Number: H988

Gergen et al. [43] Published: Nov. 5, 1991

[54] POLYMER BLENDS

[75] Inventors: William P. Gergen, Houston; Joseph M. Machado, Richmond; Dixie G. Waters; Randall P. Gingrich, both of Houston, all of Tex.

[73] Assignee: Shell Oil Company, Houston, Tex.

[21] Appl. No.: 429,915

[22] Filed: Oct. 31, 1989

[51] Int. Cl.[5] ..... C08L 77/00
[52] U.S. Cl. ..... 525/179; 525/183
[58] Field of Search ..... 525/179

[56] References Cited

U.S. PATENT DOCUMENTS

| | | | |
|---|---|---|---|
| 3,694,412 | 9/1972 | Nozaki | 260/63 CQ |
| 4,174,358 | 11/1979 | Epstein | 525/183 |
| 4,839,437 | 6/1989 | Gergen et al. | 525/426 |
| 4,874,819 | 10/1989 | George et al. | 525/185 |

FOREIGN PATENT DOCUMENTS

| | | |
|---|---|---|
| 121965 | 10/1984 | European Pat. Off. . |
| 257663 | 3/1988 | European Pat. Off. . |

*Primary Examiner*—Robert L. Stoll
*Assistant Examiner*—Joseph D. Anthony

[57] ABSTRACT

Polymer blends comprising a major proportion of a polyamide polymer and lesser proportions of a linear alternating polymer of carbon monoxide and at least one ethylenically unsaturated hydrocarbon and of an acidic polymer containing moieties of $\alpha,\beta$-ethylenically unsaturated carboxylic acid demonstrate improved properties of melt strength and melt elasticity and, over a narrower range of concentration of the linear alternating polymer, improved mechanical properties.

23 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMER BLENDS

FIELD OF THE INVENTION

This invention relates to an improved polymer blend comprising predominantly a polyamide polymer having recurring amide linkages within the polvmer chain. More particularly, the invention relates to a blend of the polyamide polymer with lesser amounts of a linear alternating polymer of carbon monoxide and at least one ethylenically unsaturated hydrocarbon and of an acidic polymer containing moieties of an α-olefin and an α,β-ethylenically unsaturated carboxylic acid.

BACKGROUND OF THE INVENTION

The class of polyamide polymers which is the major component of the blends of the invention has been known for many years. These polymers, also known as Nylons, have gained extensive commercial recognition in the production of numerous types of objects produced by many of the methods conventional for the processing of such thermoplastic polymers. Although the polyamides are useful in the formation of three-dimensional objects such as gears and motor housings, the most frequent use is probably in the production of fibers and filaments and the yarns and fabrics prepared therefrom. There are, however, certain limitations imposed by the properties of the polyamide polymers which limit their use in some applications. For example, polyamides exhibit low melt viscosity and elasticity which limit the usage of the polyamides in applications which require significant melt strength, e.g., applications such as thermoforming and blow molding. It would be of advantage to retain the more desirable properties of the polyamide polymers while improving other properties such as melt viscosity and elasticity in the melt. These advantages are often accomplished through the provision of a polymer blend.

Blends of polyamide polymers are known whereby the properties of the polyamide polymer have been modified. For example, Epstein, U.S. Pat. No. 4,174,358, describes blends of a number of polymers in a polyamide matrix which are said to show improved ductility and toughness. Blends wherein the polyamide polymer is a minor component in a blend which is predominantly linear alternating polymer of carbon monoxide and at least one ethylenically unsaturated hydrocarbon are disclosed in U.S. Pat. No. 4,839,437. These latter blends which additionally contain an acidic polymer containing moieties of α-olefin and α,β-ethylenically unsaturated carboxylic acid are disclosed in copending U.S. patent application Ser. No. 429,913, filed Oct. 31, 1989. The presence of the minor components serves to improve certain of the properties of the linear alternating polymer. It has now been found that polymeric blends wherein the polyamide is the major component demonstrate improved properties upon blending with such linear alternating polymers and such acidic polymers.

SUMMARY OF THE INVENTION

The present invention provides blends of polyamide polymers with lesser proportions of other polymeric material. More particularly, the present invention provides blends comprising major amounts of polyamide polymer with minor amounts of a linear alternating polymer of carbon monoxide and at least one ethylenically unsaturated hydrocarhon and of an acidic polymer containing moieties of α-olefin, α,β-ethylenically unsaturated carboxylic acid and, optionally a third monomer. In the acidic polymer, a portion of the carboxylic acid groups is optionally neutralized with non-alkali metal. The blends of the invention exhibit improved melt viscosity and melt elasticity and, within certain ranges of composition, improved mechanical properties.

DESCRIPTION OF THE INVENTION

The major component of the blends of the invention is a polyamide polymer. By the term "polyamide" as used herein is meant a linear condensation product containing recurring amide linkages as integral parts of the polymeric chain. These polyamide polymers are well known in the art and a number have been commercially marketed for some years under the trademark Nylon. The polyamide polymers which are useful in the blends of the invention are crystalline or amorphous polymers of linear or branched structure and have a molecular weight of at least about 5000. The preferred polyamide polymers are linear in structure, wherein each recurring unit has up to 16 carbon atoms inclusive, and the polyamide polymers have melting points in excess of about 200° C.

In one embodiment of the polyamide blend component, the polyamide is homopolymeric in character illustratively being a homopolymer of an aminocarboxylic acid of up to 16 carbon atoms inclusive. In preferred homopolymeric polyamide polymers the polymeric unit can be thought of as derived from a straight-chain omega-aminocarboxylic acid of up to 16 carbon atoms inclusive. It should be appreciated that the representation of the polyamide polymer of this embodiment as the homopolymer of aminocarboxylic acid is for convenience and in practice the monomeric unit is provided as the aminocarboxylic acid or in an equivalent form. Typically, the homopolymeric monomer unit is provided as a lactam, e.g., butyrolactam, caprolactam or lauryllactam. These homopolymeric polyamides are often referred to in terms of the number of carbon atoms in the monomeric unit. For example, the polyamide obtained from polymerization of butyrolactam is termed Nylon 4 and the homopolyamide obtained by polymerization of caprolactam is termed Nylon 6. Of these homopolymeric materials the polyamide preferred for use as a component of the blends of the invention is polycaprolactam or Nylon 6.

In an alternate embodiment of the polyamide blend component the polyamide is copolymeric in character and is illustratively represented as a condensation product of a primary diamine and a dicarboxylic acid. The primary diamine is preferably a terminal primary or alpha,omega primary diamine of up to 16 carbon atoms inclusive and having at least two carbon atoms between the primary amino groups located upon terminal carbon atoms of the diamine structure. The diamines suitably contain aromatic moieties linking the two primary amino groups as illustrated by p-phenylenediamine, 4,4'-diaminobiphenyl, di(4-aminophenyl)methane and di(4-aminophenyl) ether, or the diamines contain cycloaliphatic linking groups as in the case of di(4-aminocyclohexyl)methane or 1,4-diaminocyclooctane. The preferred diamines, however, are the acyclic terminal primary diamines of the formula $$H_2N—CH_2)_nNH_2 \quad (I)$$

wherein n is an integer from 2 to 16 inclusive, preferably from 4 to 1Z inclusive. Such polymethylenediamines include trimethylenediamine, tetramethylenediamine, hexamethylenediamine, decamethylenediamine, dodecamethylenediamine and hexadecamethylenediamine. Of these diamines, the use of hexamethylenediamine as precursor of a copolymeric polyamide blend component is preferred.

The dicarboxylic acid precursor of the copolymeric polyamide blend component has up to 16 carbon atoms inclusive, preferably up to 12 carbon atoms inclusive, and is illustrated by aromatic dicarboxylic acids such as isophthalic acid, terephthalic acid, 4,4'-biphenyldicarboxylic acid and 2,6-naphthalenedicarboxylic acid, or by cycloaliphatic dicarboxylic acids such as 1,4-cyclohexanedicarboxylic acid, 1,5-cyclooctanedicarboxylic acid and 2,3-norbornanedicarboxylic acid. The preferred dicarboxylic acids, however, are acyclic aliphatic dicarboxylic acids, particularly those straight-chain dicarboxylic acids of the formula $$HO_2C—CH_2)_mCO_2H \quad (II)$$

wherein m is an integer from 0 to 14 inclusive, preferably from 2 to 10 inclusive. Illustrative of such dicarboxylic acids are oxalic acid, pimelic acid, sebacic acid, suberic acid, adipic acid and azelaic acid. Of the acyclic aliphatic dicarboxylic acids, adipic acid is particularly preferred.

It should be appreciated that the copolymeric polyamides are represented as the condensation product of primary diamines and dicarboxylic acids for convenience and clarity and dicarboxylic acid monomer or even the primary diamine may suitably be provided in an equivalent form. For example, the dicarboxylic acid precursor of the copolymeric polyamide is often provided as a dialkyl ester of the dicarboxylic acid. The copolymeric polyamides are also often named in terms of the number of carbon atoms in the monomeric units, i.e., the number of carbon atoms in the diamine and the dicazboxylic acid monomers. For example, a particularly preferred copolymeric polyamide illustratively produced from hexamethylenediamine and adipic acid is termed Nylon 6,6. The copolymeric polyamide illustratively produced from tetramethylenediamine and dodecanedicarboxylic acid is termed Nylon 4,12.

The polymeric polymer blend components, whether homopolymeric or copolymeric, are well known materials and many polyamides are commercially available from DuPont and others. The production of such polyamide polymers is well known and conventional.

The blends of the invention comprise the polyamide component in major proportion with lesser proportions of linear alternating polymer of carbon monoxide and at least one ethylenically unsaturated hydrocarbon and an acidic polymer containing moieties of $\alpha$-olefin and $\alpha,\beta$-ethylenically unsaturated carboxylic acid. The linear alternating polymers, now becoming known as polyketones or polyketone polymers, have a repeating unit of the general formula —CO—A— wherein A is the moiety of ethylenically unsaturated hydrocarbon polymerized through the ethylenic linkage. A variety of ethylenically unsaturated hydrocarbons of up to 20 carbon atoms inclusive, preferably up to 10 carbon atoms inclusive, are useful in the production of the linear alternating polymers. Illustrative of such hydrocarbons are ethylene, propylene, 1-butene, isobutylene, styrene, 1-octene and 1-dodecene. The preferred linear alternating polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

The preferred polyketone polymers for use as a component in the blends of the invention are represented by the repeating formula $$—CO—CH_2—CH_2)]_x[CO—G)]_y \quad (III)$$

wherein G is a moiety of the second ethylenically unsaturated hydrocarbon of at least 3 carbon atoms, particularly propylene, polymerized through the ethylenic unsaturation thereof. The $—CO—CH_2CH_2—$ units and —CO—G— units when present are found randomly throughout the polymer chain and the ratio of y:x is no more than about 0.5. In the embodiment where linear alternating copolymers ar employed as the blend component, there will be no second hydrocarbon present and the copolymers are represented by the above formula III wherein y is zero. When terpolymers are employed in the blends of the invention, the terpolymers are of the above formula III wherein is greater than zero and the ratio of y:x is preferably from about 0.01 to about 0.1.

The preferred polyketone polymers will typically have a number average molecular weight, as determined by gel permeation chromatography, of from about 1000 to about 200,000, but more often from about 20,000 to about 90,000. The polymers have a melting point from about 175° C. to about 300° C. and a limiting viscosity number (LVN), measured in m-cresol at 60° C. in a standard capillary viscosity measuring device, of from about 0.8 dl/g to about 4 dl/g. The linear alternating polymers are produced by contacting the carbon monoxide and ethylenically unsaturated hydrocarbon in the presence of a catalyst composition formed from a compound of palladium, cobalt or nickel, the anion of a non-hydrohalogenic acid having a pKa less than about 6, preferably below 2, and a bidentate ligand of phosphorus, arsenic or antimony. The scope of the polymerization is extensive but, without wishing to be limited, a preferred catalyst composition is formed from a palladium alkanoate, particularly palladium acetate, the anion of trifluoroacetic acid or p-toluenesulfonic acid and a bidentate phosphorus ligand selected from 1,3-bis(diphenylphosphino)propane or 1,3-bis[di(2-methoxyphenyl)phosphino]propane. The general processes for polyketone production are illustrated by a number of published European Patent Applications including 121,965, 181,014, 213,671 and 257,663.

The polyketone polymer is employed in the blends of the invention as a minor component relative to the polyamide polymer. Amounts of polyketone polymer as low as about 1% by weight, based on total blend, will be of benefit. On the other hand, the production of the blends of the invention having more than about 20% by weight of polyketone and a major proportion of nylon is difficult because of processing difficulties so that about 20% by weight of polyketone in a major proportion of polyamide polymer represents a practical upper limit upon the proportion of polyketone polymer blend component. Preferred quantities of polyketone are from about 5% by weight to about 15% by weight of polyketone based on total polymer blend. The presence of polyketone in such quantities results in the improvement of rheological properties such as improved melt viscosity and elasticity. However, within this range, proportions of polyketone polymer from about 7% by weight to about 15% by weight, based on total polymer blend, result in improved mechanical properties such as impact strength.

The third component of the blends of the invention is an acidic polymer of α-olefin and α,β-ethylenically unsaturated carboxylic acid, optionally containing a third monomer and optionally having a portion of the carboxylic acid groups neutralized with non-alkali metal. The α-olefin precursor of the third blend component is an α-olefin of up to 10 carbon atoms inclusive as illustrated by ethylene, propylene, 1-butene, isobutylene, 1-octene and 1-decene. The preferred α-olefins are straight-chain α-olefins of up to 4 carbon atoms inclusive and particularly preferred is ethylene. The α-olefin component of the third blend component is present in a quantity of at least 65% by mole of the third blend component and is preferably present in at least 80% by mole on the same basis.

The unsaturated carboxylic acid monomer of the third blend component is an α,β-ethylenically unsaturated carboxylic acid of up to 10 carbon atoms inclusive and is illustrated by acrylic acid, 2-hexenoic acid, 2-octenoic acid and 2-decenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated carboxylic acid monomer of the acidic polymer blend component is present in an amount of from about 1% by mole to about 35% by mole, based on total acidic polymer, but amounts of unsaturated carboxylic acid from about 5% by mole to about 20% by mole on the same basis are preferred.

The acidic polymer blend component is suitably a copolymer of the α-olefin and the α,β-ethylenically unsaturated carboxylic acid and in general such copolymers are preferred. On occasion, however, it is useful to incorporate within the acidic polymer as an optional third monomer a non-acidic, low molecular weight polymerizable monomer of up to 8 carhon atoms inclusive. Such optional third monomer may be a second α-olefin such as styrene or propylene when the major α-olefin is ethylene, an unsaturated ester such as vinyl acetate, methyl acrylate or ethyl methacrylate, an unsaturated halohydrocarbon such as vinyl chloride or vinyl fluoride, or an unsaturated nitrile such as acrylonitrile. As previously stated, the presence of the third monomer is optional and is not required. Amounts of the non-acidic, low molecular weight polymerizable monomer up to about 5% by mole, based on total acidic polymer, are satisfactory with amounts up to about 3% by mole on the sam basis being preferred.

Independent of whether the acidic polymer employed as the third component in the blends of the invention is a copolymer or a terpolymer, in an optional embodiment of this third blend component a portion of the acidic carboxylic acid groups are neutralized with non-alkali metal. When partially neutralized, the blend component is polymeric in form while exhibiting ionic character and these materials are conventionally referred to as metal ionomers. In the partially neutralized embodiment, the α-olefin/unsaturated carboxylic acid polymer, with or without the optional third monomer present, is reacted with a source of ionizable non-alkali metal compound, preferably ionizable zinc, aluminum or magnesium compound, sufficient to neutralize from about 10% to about 90% of the carboxylic acid groups present in the polymer. Such neutralization, particularly with zinc, the preferred metal, results in a uniform distribution of metal throughout the polymer. Neutralization of from about 20% to about 80% of the carboxylic acid groups present is preferred in this embodiment and particularly preferred is neutralization of from about 25% to about 75%. The ionizable metal compound utilized in the neutralization is a source of uncomplexed non-alkali metal ions including zinc ions, aluminum ions or magnesium ions which are provided in compounds of the type referred to as metal salts, e.g., zinc acetate, zinc formate or zinc propionate, or is a source of complexed metal ions wherein the metal is bonded to two types of groups, at least one of which is readily ionized and at least one other group is not. Illustrative of such complexed metal ions are mixed zinc salts with one weak acid such as oleic acid or stearic acid and one more readily ionizable acid such as acetic acid or formic acid. In general, neutralization with a complexed metal ion is preferred in this embodiment.

The acidic polymers employed as the third component, optionally partially neutralized, are conventional and many are commercial. Copolymers of ethylene and acrylic acid are marketed by Dow under the trademark PRIMACORE® and copolymers of ethylene and methacrylic acid are marketed by DuPont under the trademark NUCREL®. Partially neutralized polymers are marketed by DuPont under the trademark SURLYN®. The amount of the acidic polymer blend component to be utilized in the blends of the invention is not critical and quantities from about 0.05% by weight to about 10% by weight, based on total blend, are satisfactory. Amounts of the third blend component from about 0.1% by weight to about 5% by weight on the same basis are preferred.

The method of producing the blend of the polyamide polymer, the linear alternating polymer and the acidic polymer is not material so long as a uniform mixture of the components is obtained, i.e., an intimate mixture of the components which will not delaminate on processing. The blends of the invention are non-miscible blends with the linear alternating polymer and the acidic polymer existing as discrete phases within the polyamide matrix. The blend will not, of course, be homogeneous, but good results are obtained in the improvement of properties when the blend is substantially uniform. The method of blending the components is that which is conventional for non-miscible thermoplastic materials. In one modification, the components are blended by passage through a co-rotating twin screw extruder operating at high RPM to produce the blend as an extrudate. In an alternate modification, the blend components are blended in a mixing device which exhibits high shear and thermal energy.

The blends of the invention may also contain conventional additives such as antioxidants, stabilizers, mold release agents, fire retardant materials and other substances which improve the processability of the blend components or improve the properties of the blend. Such additives are incorporated within the blend by conventional methods prior to, together with or subsequent to the blending of the components.

The blends of the invention are characterized by increased melt viscosity and elasticity as compared to the unblended polyamide polymers and are useful in the production of containers for food and drink by conventional methods such as thermoforming and blow molding which are not customarily available for articles produced from polyamide polymer. Within a more narrow range of concentration of the linear alternating polymer, the mechanical properties of the polymer, particularly impact strength, are improved to thereby enable the polymers to be employed in applications such as external automobile parts which are subject to being impacted by other objects.

The invention is further illustrated by the following Illustrative Embodiments which should not be construed as limiting the invention.

Illustrative Embodiment I

Blends according to the invention were produced from a) ZYTEL 101 ®, a commercially available Nylon 6,6,
b) a linear alternating terpolymer of carbon monoxide, ethylene and propylene having a melting point of 218° C. and a limiting viscosity number (LVN), measured in m-cresol at 60° C., of 1.84 dl/g, and
c) NUCREL 535 ®, a copolymer of ethylene and methacrylic acid.

The blends were compounded on a Haake 30 mm co-rotating, twin screw extruder having a L/D ratio of 13. Test specimens were prepared on an Arburg 25 ton injection molding machine having a screw L/D ratio of 18 and were stored over desiccant until testing. The blends subjected to rheological testing were compression molded into 30 mil plaques and tested by standard procedures.

Illustrative Embodiment II

The melt viscosity of several blends was determined in a Rheometrics Mechanical Spectrometer operating with parallel plates at 275° C. in oscillatory mode at 1 rad/sec and 25% strain amplitude. Five blend samples containing from 4 to 15% by weight of the terpolymer and 1% by weight of NUCREL 535 ® were evaluated together with unblended ZYTEL 101 ® to serve as control and a blend containing 20% terpolymer and 1% NUCREL 535 ®. In the case of the unblended ZYTEL 101 ®, the melt viscosity was substantially constant over time at a low value. In all other cases the melt viscosity was higher than the control and, except for the 20% blend, was qualitatively proportional to the terpolymer concentration. The melt viscosity increased until a maximum was reached in 3 to 5 minutes followed by a slow decrease with time. The sample containing 20% terpolymer and 1% NUCREL ® had a very high initial melt viscosity but decreased with time.

Illustrative Embodiment III

The initial melt viscosities of the blends of Illustrative Embodiment II were compared with the percent by weight of the terpolymer in the composition. The results are shown in Table I.

TABLE I

| Sample, % wt Terpolymer | Viscosity, 1000 Pa sec |
|---|---|
| 0 | 0.23 |
| 2 | 1.47 |
| 4 | 1.84 |
| 6 | 2.40 |
| 8 | 3.45 |
| 15 | 9.52 |
| 20 | 27 |

A similar set of determinations using a terpolymer of higher molecular weight, melting point=218° C., LVN=2.25 dl/g, produced results qualitatively similar to those of Table I. The improvement in melt viscosity wa higher when larger proportions of terpolymer were present in the blend, but the improvement was not as great as that shown in Table I.

Illustrative Embodiment IV

The mechanical properties of the blends of Illustrative Embodiment I were evaluated for blends containing 0% to 10% by weight terpolymer and 1% by wt. NUCREL 535 ®. Specimens were in the "dry as molded" condition.

Calculations of elongation of a specimen as a function of stress imposed upon the sample were determined. The Nylon control and specimens containing up through 6% terpolymer exhibited low elongation and fractured prior to yielding. Blends containing 8% or more terpolymer exhibited plastic yielding followed by significant deformation prior to fracture. Elongation undergoes a discontinuous increase at 8% by weight terpolymer. The tensile strength properties are shown in Table II.

TABLE II

| Composition % wt (ex NUCREL 535 ®) | | Yield Stress | Break Stress | Elongation |
|---|---|---|---|---|
| ZYTEL ® | Terpolymer | (psi) | (psi) | (%) |
| 100 | 0* | — | 8960 | 2.6 |
| 100 | 0 | — | 3940 | 1.0 |
| 98 | 2 | — | 5430 | 1.5 |
| 96 | 4 | — | 6610 | 1.8 |
| 94 | 6 | — | 7030 | 2.1 |
| 92 | 8 | 12,160 | 8920 | 33 |
| 90 | 10 | 11,410 | 9130 | 31 |

*This sample does not contain NUCREL 535 ®; all others contain 1 wt %.

The notched Izod values for these blends were determined at 23° C. and at 0° C. by standard procedures. The results are shown in Table III.

TABLE III

| Composition, % wt (ex NUCREL 535 ®) | | Notched Izod (ft lb/in) | |
|---|---|---|---|
| ZYTEL 101 ® | Terpolymer | 23° C. | 0° C. |
| 100 | 0* | 0.86 | 0.69 |
| 100 | 0 | 0.77 | 0.57 |
| 98 | 2 | 1.27 | 0.66 |
| 96 | 4 | 1.12 | 0.82 |
| 94 | 6 | 1.08 | 0.65 |
| 92 | 8 | 1.37 | 0.82 |
| 90 | 10 | 1.18 | — |

*This sample does not contain NUCREL 535 ®; all others contain 1 wt %.

The Gardner impact values at room temperature was determined for these blends by standard procedures. The results are shown in Table IV.

TABLE IV

| Composition, % wt (ex NUCREL 535 ®) | | Gardner Impact |
|---|---|---|
| ZYTEL 101 ® | Terpolymer | (in lb) |
| 100 | 0* | 25 |
| 100 | 0 | 19 |
| 98 | 2 | 133 |
| 96 | 4 | 134 |
| 94 | 6 | 114 |
| 92 | 8 | >400 |
| 90 | 10 | 331 |

*This sample does not contain NUCREL 535 ®; all others contain 1 wt %.

What is claimed is:

1. A polymer blend comprising a major proportion of a polyamide polymer having each recurring unit of up to 16 carbon atoms and a melting point in excess of 200° C., and lesser proportions of (a) a linear alternating polymer of carbon monoxide and at least one ethylenically unsaturated hydrocarbon, and (b) an acidic polymer containing moieties of $\alpha$-olefin and $\alpha,\beta$-ethylenically unsaturated carboxylic acid, optionally with a third monomer, the monomer being a non-acidic, low molecular weight polymerizable monomer, and optionally with a portion of the carboxylic acid group neutralized with non-alkali metal.

2. The blend of claim 1 wherein the linear alternating polymer is present in a quantity of from about 1% by weight to about 20% by weight, based on total blend, and is represented by the repeating formula $$-CO-CH_2-CH_2)]_x[CO-G)]_y$$

wherein G is a moiety of ethylenically unsaturated hydrocarbon of up to 3 carbon atoms polymerized through the ethylenic unsaturation and the ratio of y:x is no more than about 0.5.

3. The blend of claim 2 wherein the acidic polymer is copolymer of $\alpha$-olefin and $\alpha,\beta$-ethylenically unsaturated carboxylic acid, the amount of this blend component being from about 0.1% by weight to about 5% by weight based on total blend.

4. The blend of claim 3 wherein the polyamide polymer is homopolymeric.

5. The blend of claim 4 wherein G is a moiety of propylene and the ratio of y:x is from about 0.01 to about 0.1.

6. The blend of claim 5 wherein the acidic polymer is not neutralized.

7. The blend of claim 6 wherein the polyamide is polycaprolactam.

8. The blend of claim 7 wherein the linear alternating polymer is present in an amount from about 7% to about 15% by weight, based on total blend.

9. The blend of claim 7 wherein the acidic polymer is a copolymer of ethylene and acrylic acid.

10. The blend of claim 7 wherein the acidic polymer is a copolymer of ethylene and methacrylic acid.

11. The blend of claim 3 wherein the polyamide polymer is a copolymer of a terminal, primary diamine of up to 16 carbon atoms inclusive and a dicarboxylic acid of up to 16 carbon atoms inclusive.

12. The blend of claim 11 wherein the diamine is of the formula $$H_2N-CH_2)_nNH_2$$

wherein n is an integer from 2 to 16 inclusive.

13. The blend of claim 12 wherein the dicarboxylic acid is of the formula $$HO_2C-CH_2)_mCO_2H$$

wherein m is an integer from 0 to 14 inclusive.

14. The blend of claim 13 wherein G is a moiety of propylene and the ratio of y:x is from about 0.01 to about 0.1.

15. The blend of claim 14 wherein the acidic polymer is not neutralized.

16. The blend of claim 15 wherein n is 6.

17. The blend of claim 16 wherein m is 12.

18. The blend of claim 16 wherein m is 6.

19. The blend of claim 18 wherein the acidic polymer is a copolymer of ethylene and acrylic acid.

20. The blend of claim 18 wherein the acidic polymer is a copolymer of ethylene and methacrylic acid.

21. The blend of claim 18 wherein the linear alternating polymer is present in an amount from about 7% by weight to about 15% by weight, based on total blend.

22. The blend of claim 21 wherein the acidic polymer is a copolymer of ethylene and acrylic acid.

23. The blend of claim 21 wherein the acidic polymer is a copolymer of ethylene and methacrylic acid.

* * * * *